(12) United States Patent
Wyman

(10) Patent No.: US 7,468,756 B2
(45) Date of Patent: Dec. 23, 2008

(54) DETECTION AND PHASE LOCK OF 2:2 AND 3:2 PULL-DOWN VIDEO

(75) Inventor: Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 456 days.

(21) Appl. No.: 11/018,987

(22) Filed: Dec. 21, 2004

(65) Prior Publication Data

US 2006/0072036 A1 Apr. 6, 2006

Related U.S. Application Data

(60) Provisional application No. 60/616,007, filed on Oct. 5, 2004, provisional application No. 60/616,071, filed on Oct. 5, 2004.

(51) Int. Cl.
*H04N 5/253* (2006.01)
(52) U.S. Cl. ........................................ 348/558; 348/448
(58) Field of Classification Search ................. 348/558, 348/448, 451, 452, 441, 459, 458, 911, 97, 348/700
See application file for complete search history.

(56) References Cited

U.S. PATENT DOCUMENTS

| | | | |
|---|---|---|---|
| 4,400,719 A | 8/1983 | Powers | |
| 5,337,154 A | 8/1994 | Dorricott et al. | |
| 5,428,399 A | 6/1995 | Robinson et al. | |
| 5,457,499 A * | 10/1995 | Lim | 348/474 |
| 5,861,924 A * | 1/1999 | Pan et al. | 348/451 |
| 5,982,444 A * | 11/1999 | Kato et al. | 348/446 |
| 6,055,018 A | 4/2000 | Swan | |
| 6,262,773 B1 * | 7/2001 | Westerman | 348/448 |
| 6,269,484 B1 | 7/2001 | Simsic et al. | |
| 6,317,165 B1 | 11/2001 | Balram et al. | |
| 6,407,775 B1 | 6/2002 | Frink et al. | |
| 6,459,455 B1 | 10/2002 | Jiang et al. | |
| 6,563,550 B1 | 5/2003 | Kahn et al. | |
| 6,603,815 B2 | 8/2003 | Suzuki et al. | |
| 6,614,484 B1 | 9/2003 | Lim et al. | |
| 6,680,752 B1 | 1/2004 | Callway et al. | |
| 6,970,206 B1 | 11/2005 | Swan et al. | |
| 7,020,197 B2 | 3/2006 | Tanase et al. | |
| 7,042,512 B2 | 5/2006 | Yang et al. | |
| 7,075,581 B1 * | 7/2006 | Ozgen et al. | 348/448 |
| 7,129,990 B2 * | 10/2006 | Wredenhagen et al. | 348/449 |
| 7,170,561 B2 | 1/2007 | Winger et al. | |
| 7,177,470 B2 | 2/2007 | Jasinschi et al. | |

(Continued)

*Primary Examiner*—David Ometz
(74) *Attorney, Agent, or Firm*—McAndrews, Held & Malloy, Ltd.

(57) ABSTRACT

Herein described is a system and method of detecting 2:2 and/or 3:2 pull-down video. In addition, aspects of the present invention provide a system and method to identify and lock onto a field phase of a received 2:2 or 3:2 pull-down video signal. The system for detecting a field phase in 2:2 pull-down video comprises a first circuitry that computes unexpected motion values, a second circuitry that implements an alternating straight through or crossover function, a third circuitry that performs processing and generates one or more control signals, a pair of counters, and a phase selection circuitry. The method comprises computing luminance approximations of pixels associated with an output video frame, computing one or more first differences, and computing a second difference for each absent pixel of the output video frame based on one of five field phases.

23 Claims, 7 Drawing Sheets

U.S. PATENT DOCUMENTS

| | | | |
|---|---|---|---|
| 7,202,907 B2 * | 4/2007 | Chow .................... 348/441 |
| 2002/0171759 A1 | 11/2002 | Handjojo et al. |
| 2003/0156301 A1 * | 8/2003 | Kempf et al. ............ 358/486 |
| 2004/0012673 A1 | 1/2004 | Tanase et al. |
| 2005/0018087 A1 * | 1/2005 | Lee ........................ 348/700 |
| 2005/0030422 A1 | 2/2005 | Leone et al. |
| 2005/0057646 A1 | 3/2005 | Cho et al. |

* cited by examiner

DETECTION AND PHASE LOCK OF 2:2 AND 3:2 PULL-DOWN VIDEO

CROSS-REFERENCE TO RELATED APPLICATIONS/INCORPORATION BY REFERENCE

This application makes reference to and claims priority from U.S. Provisional Patent Application Ser. No. 60/616,007 entitled "Detection and Phase Lock of 2:2 and 3:2 Pull-Down Video" filed on Oct. 5, 2004, the complete subject matter of which is incorporated herein by reference in its entirety.

This application makes reference to and claims priority from U.S. Provisional Patent Application Ser. No. 60/616,071 entitled "Detection and Correction of Irregularities While Performing Inverse Telecine Deinterlacing of Video" filed on Oct. 5, 2004, the complete subject matter of which is incorporated herein by reference in its entirety.

This application makes reference to:

U.S. Provisional Application Ser. No. 60/61,6071, filed Oct. 5, 2004;

U.S. patent application Ser. No.11/019,071, filed Dec. 21, 2004;

U.S. patent application Ser. No. 10/945,587, filed Sep. 21, 2004; and

U.S. patent application Ser. No. 10/871,758, filed Jun. 17, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In order to properly display video onto a television system that was originally recorded using film, the video must be converted into an appropriate format. The source film may be authored at 24 or 30 frames per second. The effective television display rate may be 50 or 60 hertz. When the PAL standard is used to display video, source film that is authored at 24 frames per second must be converted for displaying at 50 hertz. On the other hand, when NTSC standard is used, source film may be authored at 30 frames per second using a computer and subsequently converted for display at a rate of 60 hertz. In either of these conversions a technique referred to as 2:2 pull-down is used to convert the source film to the appropriate display rate, depending on the standard used.

While the 2:2 pull-down process may restore the proper rate of display of video, one or more irregularities introduced within the video stream may affect the cadence of the interlaced 2:2. These irregularities may be introduced when video is edited. When left uncorrected, the video stream processed by a typical television system may generate visually distorted images.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in at least a system and a method of detecting a 2:2 and/or 3:2 pull-down video. In addition, various aspects of the present invention provide a system and method to identify and lock onto a field phase of a received 2:2 and/or 3:2 pull-down video signal. Various aspects of the invention employ the use of 2:2 pull-down in combination with 3:2 pull-down algorithms and architectures, for performing cadence detection and reverse pull-down.

In a representative embodiment, a method of detecting a field phase in 2:2 and/or 3:2 pull-down video comprises computing an approximation of the luminance for each absent pixel wherein each absent pixel is associated with an output video frame, and the computing uses one or more present pixels.

In a representative embodiment, a system for detecting a field phase in 2:2 pull-down video comprises a first circuitry that computes frame unexpected motion values, a second circuitry that receives the frame unexpected motion values from the first circuitry as its inputs, the inputs processed using an alternating straight through or crossover function to generate corresponding outputs, a third circuitry that processes the outputs generated by the second circuitry to generate one or more control signals, a pair of counters that receives the one or more control signals and generates a pair of outputs, and a fourth circuitry that locks onto one of two field phases based on the pair of outputs generated by the pair of counters.

In yet another representative embodiment, a system for detecting and locking onto a field phase of a pull-down video comprises a memory, a processor and a set of software instructions resident in the memory, wherein the processor executes the set of software instructions such the detection and locking of the pull-down video occurs.

These and other advantages, aspects, and novel features of the present invention, as well as details of illustrated embodiments, thereof, will be more fully understood from the following description and drawings.

DETAILED DESCRIPTION OF THE INVENTION

Figure 1:
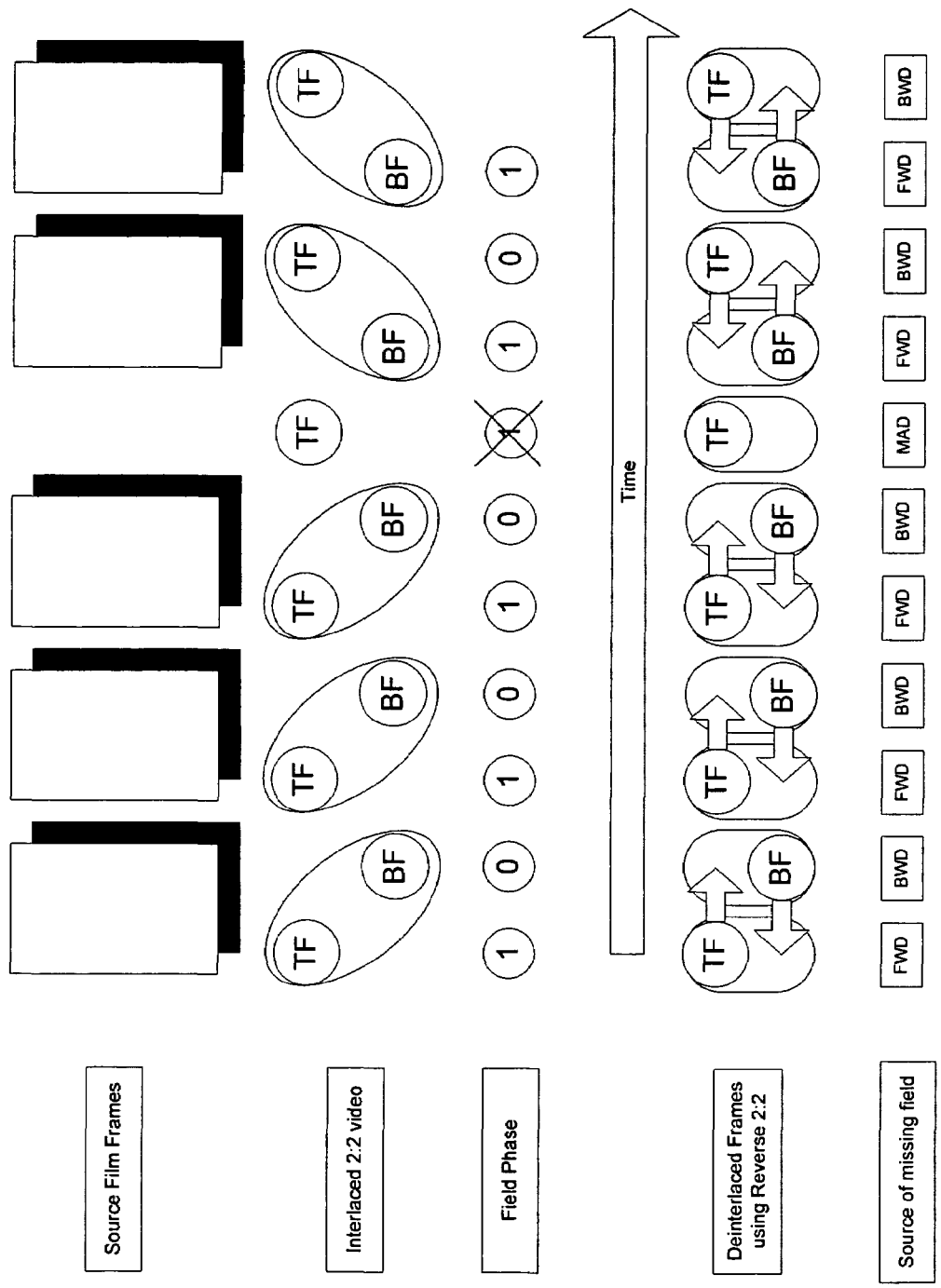
FIG. 1 is a block diagram illustrating the operation of performing reverse 2:2 pull-down when an interlaced 2:2 pull-down video is received, in accordance with an embodiment of the invention.

Various aspects of the present invention allow for the detection, phase lock, and reverse pull-down of pull-down interlaced video. Various aspects of the invention may comprise a plurality of algorithms and architectures for performing pull-down cadence detection and phase lock of a received video signal. Various aspects of the invention employ the use of 2:2 pull-down in combination with 3:2 pull-down algorithms and architectures, for performing cadence detection and reverse pull-down.

Aspects of the present invention may be used with, or in addition to, one or more representative embodiments described in U.S. patent application Ser. No. 10/871,758, filed Jun. 17, 2004. The one or more representative embodiments may comprise a plurality of algorithms and architectures capable of performing 3:2 pull-down cadence detection and reverse 3:2 pull-down of a received video signal. Accordingly, U.S. patent application Ser. No. 10/871,758, filed Jun. 17, 2004 is hereby incorporated herein by reference in its entirety.

Advantages that aspects of the present invention enable include operating 3:2 and 2:2 detection circuitry in parallel for facilitating immediate processing of either 3:2 or 2:2 pull-down video in a video processing system, thereby eliminating the presence of annoying artifacts by accurately detecting and locking onto a phase of the pull-down video signal. As a result, aspects of the invention decrease the likelihood of erroneous 3:2 or 2:2 detection while correctly detecting the presence of 3:2 or 2:2 video material, even in the presence of noise.

In order to perform the reverse pull-down, aspects of the present invention provide one or more systems and methods to lock onto the field phase of the received pull-down video signal. The algorithms and architectures that perform the reverse 3:2 and 2:2 pull-down may be adapted to acquire interlaced video fields from one of a plurality of video sources in the video network and to convert the acquired interlaced video fields into progressive frames, at double the display rate, in a visually pleasing manner. Various aspects of the invention may be used, for example, when video is formatted using the PAL format standard. When video is formatted using PAL, 2:2 pull-down is used. In certain instances, video formatted in NTSC may also utilize 2:2 pull-down, for example, when video material originates from computer generated video that is authored at 30 frames per second. In this instance, 2:2 is used to generate 60 fields per second. In a representative embodiment, the received video signal may comprise an interlaced 3:2 pull-down process used for NTSC video. The field phase of the video signal is used to perform a reverse 3:2 pull-down on interlaced 3:2 video. The reverse 3:2 pull-down facilitates the re-generation of original source film frames that may be utilized in generating de-interlaced progressive video. For PAL formatted video, up to 720×576i is accepted while producing 720×576p. For NTSC formatted video, the system receives 720×480i and outputs 720×480p. In another representative embodiment, the system receives 720×480i (PAL-M format) and outputs 720×480p.

Hereinafter, a system that detects a 2:2 pull-down field and generates a field phase lock will be termed either a 2:2 phase lock detector (PLD) while a system that detects a 3:2 pull-down field and generates a field phase lock will be termed a 3:2 phase lock detector (PLD).

FIG. 1 is a block diagram illustrating the operation of performing reverse 2:2 pull-down when an interlaced 2:2 pull-down video is received in accordance with an embodiment of the invention. One or more source film frames are shown in the top portion of FIG. 1. Two source film frames captured at a rate of 24 frames per second are used to generate 2 fields of video run at 48 fields per second. The video is subsequently displayed at 50 fields per second. Thus, the interlaced 2:2 video comprises a sequence of top and bottom fields (labeled TF and BF) running at 48 fields per second. As shown, two fields (a top field and a bottom field) in the interlaced 2:2 video represent each source film frame. Since the interlaced video has a periodicity of 2 fields, the field phase may be represented by a modulo 2 counter, as indicated by the field phase. Subsequently, the interlaced video is de-interlaced using reverse 2:2 pull-down as illustrated in the fourth row of FIG. 2. The directional arrows provide an indication of what source film frame is to be used to generate the missing field in order to display de-interlaced progressive video. The last row of FIG. 1 illustrates the direction of the weave (either forwards or backwards in time) required in order to correctly generate the source film frame used when displaying de-interlaced progressive video. FIG. 1 also depicts an exemplary bad-edit, as indicated by the unpaired top field that displays the interlaced 2:2 video. When a bad-edit occurs, reverse 2:2 pull-down may be abandoned in favor of using motion adaptive deinterlacing (MAD). As shown, the 2:2 process may resume using the opposite phase. As illustrated, the interlaced 2:2 pull-down signal may start with the top field or bottom field in the interlaced pair.

Figure 2:
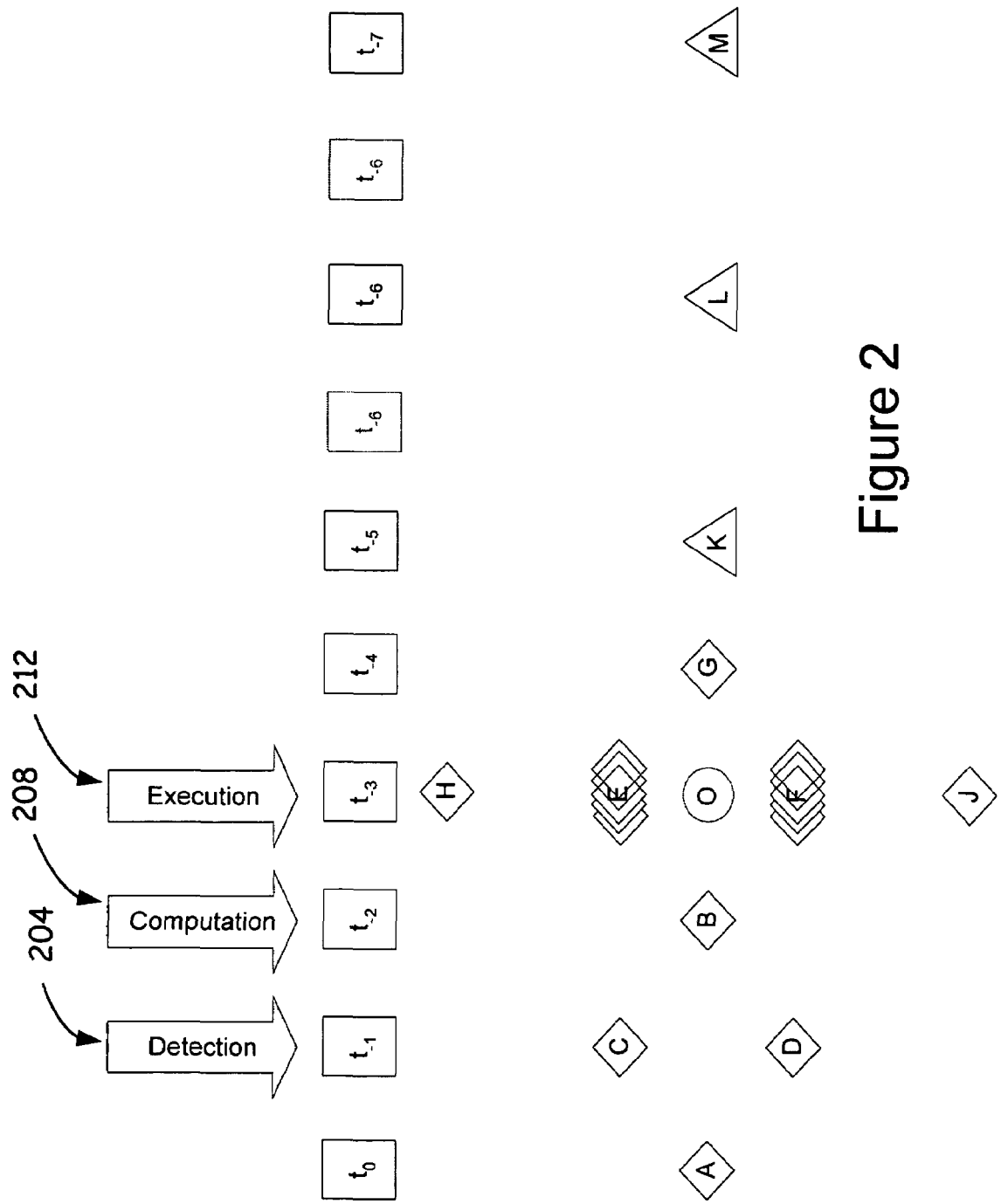
FIG. 2 illustrates an exemplary pixel constellation that is used in performing reverse 2:2 or 3:2 pull-down, in accordance with an embodiment of the invention.

FIG. 2 illustrates an exemplary pixel constellation that is used in performing reverse 2:2 or 3:2 pull-down, in accordance with an embodiment of the invention. The embodiment of FIG. 2 also illustrates a temporal sequence of one or more functional operations that are effectively implemented by way of pipelined processing, in accordance with an embodiment of the invention. In reference to FIG. 2, the abscissa axis is represented by way of discrete indicators $t_0, t_{-1}, t_{-2}, t_{-3}$, etc. In reference to the lower portion of FIG. 2, the lettered elements correspond to a pixel constellation. The pixel constellation varies temporally along the abscissa and spatially along the ordinate. In one embodiment, the three operational functions are termed detection, computation, and execution. In the first functional timeframe 204, the aforementioned statistics are collected. In the second functional timeframe 208, a CPU (central processing unit) or a reverse 2:2 or 3:2 pull-down circuitry performs the required calculations to determine the current field phase. Before the end of the second functional timeframe, the configuration is readied so that at the third functional timeframe 212, a correct selection for each absent pixel may be made, by way of a reverse 2:2 or 3:2 directed weave process. At one or more points in time, an assessment using the three functional operations may be made. In a representative embodiment, a 2:2 phase lock detector (2:2 PLD) receives interlaced 2:2 pull-down video (PAL format) and processes the video field by field. In another representative embodiment, a 3:2 phase lock detector (3:2 PLD) receives interlaced 3:2 pull-down video (e.g. NTSC format) and processes the video field by field. In order to implement reverse pull-down, the 2:2 PLD or 3:2 PLD must assess whether the input was originally sourced from film. Once this is determined, the current field phase must be determined so that the reverse directed weave may be performed. The 2:2 or 3:2 PLD determines whether the received video is, in fact, interlaced 2:2 or 3:2 video by analyzing the correlation characteristics of one or more pixel pairs. In a representative embodiment, the 2:2 PLD computes frame unexpected motion values over time, while the 3:2 PLD computes frame variances over time with respect to a pair of fields displaced by two field phase periods, since repeated fields of 3:2 pull-down video occur exactly t=2 field phase units between themselves.

Figure 3:
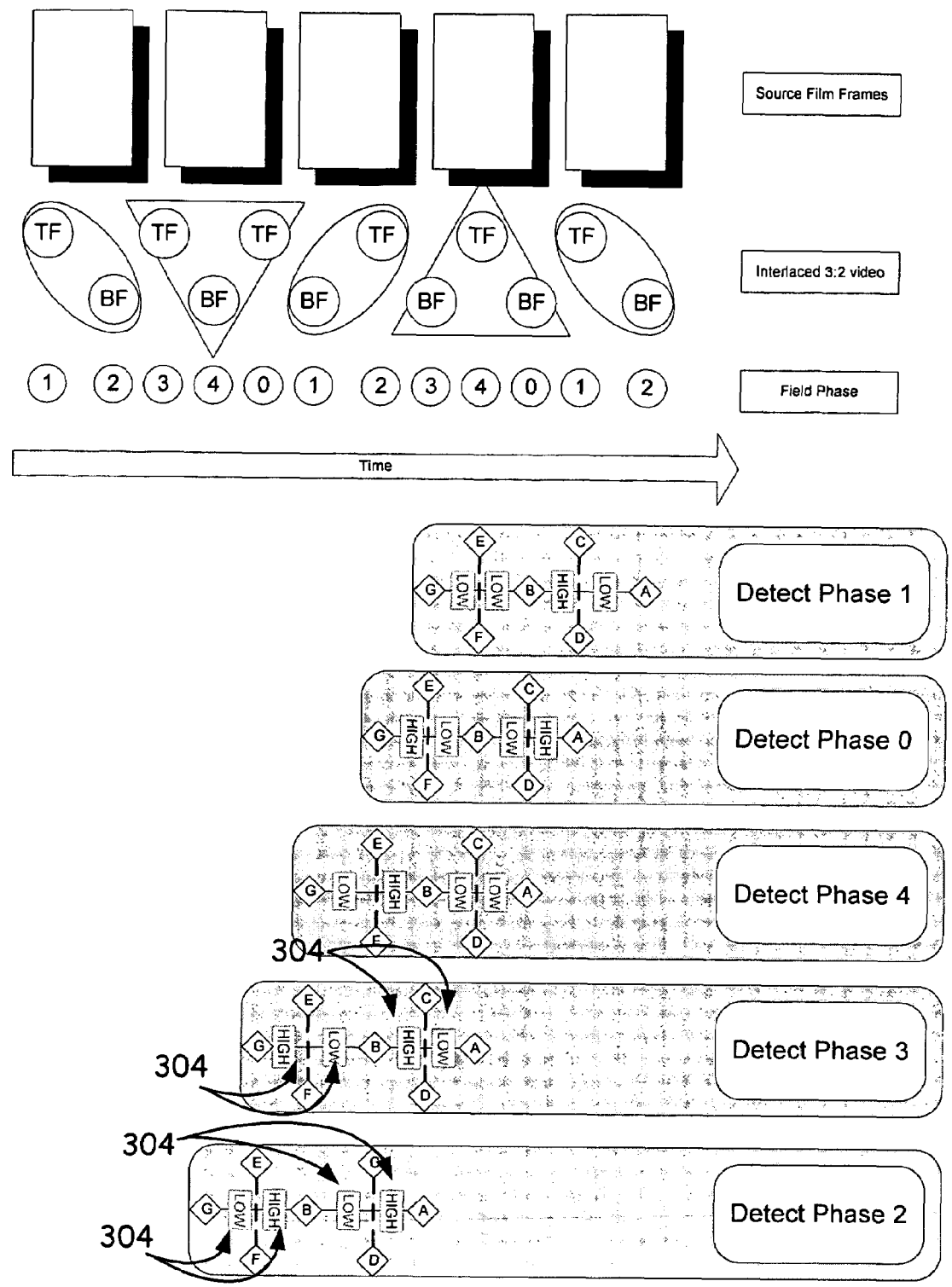
FIG. 3 is a block diagram illustrating a method of using one or more luma values of present pixels of an exemplary pixel constellation to determine conformity to one or more expected "High/Low" luma difference patterns characteristic of 3:2 pull-down video, as referenced in the detection stage, in accordance with an embodiment of the invention.

FIG. 3 is a block diagram illustrating a method of using one or more luma values of present pixels of an exemplary pixel constellation to determine conformity to one or more expected "High/Low" luma difference patterns characteristic of 3:2 pull-down video, as referenced in the detection stage, in accordance with an embodiment of the invention. Shown in FIG. 3 are the High-Low patterns in the detection phase as defined for 3:2 pull-down video. The pixel constellation comprises the pixels labeled A through G shown in FIG. 2. The expected "High/Low" differences of the "High/Low" difference patterns 304 are computed by taking the difference between one or more luma values of present pixels (i.e., one or more available pixels, as provided by the source film frames, and represented by the pixel constellation) of the exemplary pixel constellation and one or more luma values of a missing or absent pixel of the progressive video output frame. The "High" differences have luma values that are large in magnitude and are associated with corresponding pixels of different source film frames. The "Low" differences have luma values that are small in magnitude and are associated with corresponding pixels of the same source film frame. FIG. 3 illustrates an embodiment, in which the "High/Low" luma difference patterns 304 utilize two absent or missing pixels or a pair of absent or missing pixels. It is contemplated that in other representative embodiments, more than two absent or missing pixels and their associated pixel constellations may be used to characterize one or more "High/Low" luma difference patterns or field difference patterns 304. As a prerequisite to computing the one or more "High" or "Low" differences, the two absent or missing pixels are approximated using one or more present pixels (i.e., available pixels), as provided by the pixel constellation shown. In the embodiment of FIG. 3, the absent or missing pixels are approximated using adjacent vertical pixels of fields derived from the same source film frame. With reference to FIG. 2, one may mathematically define the vertical approximation of the absent or missing pixels as follows:

$$\alpha = \frac{C+D}{2}, \beta = \frac{E_0 + F_0}{2},$$

where $E_0$ and $F_0$ correspond to spatially identical pixels occurring two time units from C and D, and having a horizontally spatial component that lies in the same plane as C and D. Pixels C and D correspond to adjacent pixels positioned in a vertically spatial direction. Likewise, pixels $E_0$ and $F_0$ correspond to adjacent pixels in the vertically spatial direction. The vertically adjacent pixels are obtained from fields derived from the same source film frame.

Using the pixel constellation previously defined, the luma difference for the absent or missing pixel and corresponding present pixel in an adjacent field may be defined mathematically as follows:

$d_0 = \text{abs}(A - \alpha)$ $d_1 = \text{abs}(B - \alpha)$ $d_2 = \text{abs}(B - \beta)$ $d_3 = \text{abs}(G - \beta)$ Referring to FIG. 3, there are shown five different "High/Low" luma difference patterns or field difference patterns 304 associated with the five different field phases as referenced at the detection processing stage of the aforementioned three stage processing pipeline.

In a representative embodiment, a measure of "unexpected motion" or unexpectedness of the "High/Low" luma difference patterns or field difference patterns 304 is provided by computing the maximum of the low luma difference values and subtracting this value with the average of the high luma difference values. As illustrated in Table 1, the "unexpected motion" termed the detector pixel unexpected motion, m, is represented by one or more equations. The one or more equations are expressed using the one or more luma differences associated with the luma difference patterns 304 shown in FIG. 3.

TABLE 1

| Field Phase at Detector | Expected High/Low Pattern | Detector Pixel Unexpected Motion (m) |
|---|---|---|
| 0 | HIGH-LOW-LOW-HIGH | $\text{MAX}\langle d_1, d_2\rangle - \left(\frac{d_0 + d_3}{2}\right)$ |
| 1 | LOW-HIGH-LOW-LOW | $\text{MAX}\langle d_0, d_2, d_3\rangle - d_1$ |
| 2* | HIGH-LOW-HIGH-LOW | $\text{MAX}\langle d_1, d_3\rangle - \left(\frac{d_0 + d_2}{2}\right)$ |
| 3* | LOW-HIGH-LOW-HIGH | $\text{MAX}\langle d_0, d_2\rangle - \left(\frac{d_1 + d_3}{2}\right)$ |
| 4 | LOW-LOW-HIGH-LOW | $\text{MAX}\langle d_0, d_1, d_3\rangle - d_2$ |

Table 1 provides expected frame "High/Low" difference patterns for each detection field phase of the video processing system. As a consequence, the detector pixel unexpected motion, m, should compute to a low value at the field phase that corresponds with the High-Low pattern. The detector pixel unexpected motion, m, should compute to a high value for the other field phases.

In reference to FIG. 3, one may recognize that the High-Low patterns of detect phases 2 and 3 are exactly the same High-Low patterns that would be expected when receiving 2:2 pull-down video. These two field phases are labeled with an asterisk in Table 1. Instead of rotating through the five phases associated with 3:2 pull-down, 2:2 pull-down video would be expected to alternate between these two phases (i.e., detect phases 2 and 3). If the expected High-Low patterns are processed in parallel with the received 2:2 pull-down signal, it would be expected that one (e.g., LOW-HIGH-LOW-HIGH) of the two High-Low patterns will match the field luma differences and give low values for m. As a consequence, the luma differences of pixels summed over the entire corresponding progressive video output frame would yield a low value for the frame unexpected motion. Simultaneously, the opposite High-Low pattern (e.g., HIGH-LOW-HIGH-LOW) may not correlate well with the received 2:2 pull-down signal; and as a result, the detector pixel unexpected motion, m, summed over the entire corresponding progressive video output frame, may generate a large value for the frame unexpected motion. At the next field period, the roles of the two patterns (assuming 2:2 pull-down is received) would be expected to switch. The frame unexpected motion values are computed by way of the following equation:

$$\text{Frame\_unexpected\_motion} \mathrel{+}= \begin{cases} 0 & \text{when } -255 \le m < 4 \\ 1 & \text{when } 4 \le m < 8 \\ 2 & \text{when } 8 \le m < 16 \\ 4 & \text{when } 16 \le m < 32 \\ 8 & \text{when } 32 \le m \le 255 \end{cases} \quad \text{(Equation 1)}$$

The frame unexpected motion is determined by summing the pixel unexpected motion at the detector, m, over the entire corresponding progressive video output frame. As shown in this representative embodiment, the (detector) pixel unexpected motion, m, may be mapped, based on its value, to one or more discrete values (e.g., 0, 1, 2, 4, 8).

In reference to the above equation, the shorthand notation, Frame_unexpected_motion+=, indicates that the term Frame_unexpected_motion is determined by accumulating the detector pixel unexpected motion, m, over all pixels in a frame. The value for the Frame_unexpected_motion is zeroed or reset between output frames using a control signal for resetting registers. In the detection of 2:2 pull-down, one may apply the High-Low patterns for detect phase 2 and detect phase 3 previously determined for 3:2 pull-down. When 2:2 pull-down is received, one may define two detect phase states, 0 and 1, for example. For example, one may define detect phase 0 to correspond with detect phase 2 (3:2 pull-down) and detect phase 1 to correspond with detect phase 3 (3:2 pull-down), or vice-versa.

The 3:2 PLD on the other hand, computes a histogram of the absolute differences between top field (or bottom field) interlaced 3:2 video pixels at $t_{-1}=-1$ (time=-1) and at $t_{-3}=-3$ (time=-3). Of course, the number of absolute differences calculated between a large number of pixel pairs provides a more accurate value of the variance.

Mathematically, the absolute difference may be calculated by the following equation when the current output frame is top field originated:

Absdiff=abs($C-E_0$)

The absolute difference may be calculated by the following equation when the current output frame is bottom field originated:

Absdiff=abs($C-F_0$)

The absolute differences are collected in a histogram table to approximate the probability distribution. In one embodiment, the histogram table has 64 identically sized bins each 4 units wide. $\text{Bin}_0$ collects absolute differences equal to 0 through 3, while $\text{bin}_1$ collects absolute difference values equal to 4 through 7, etc. The histogram table is double buffered so that the contents of the table can be read by either the CPU or the reverse 3:2 pull-down circuitry of the MAD-3:2 while statistics for the next field is being collected. A value for the variance of the distribution is approximated using the following formula:

$$\text{sigma} = bin_1 + 2(bin_2 + bin_3) + 4(bin_4 + bin_5 + bin_6 + bin_7) + 8\sum_{n=8}^{63} bin_n$$

For example, $bin_2$ gives the number of absolute differences that were between the values 8 and 11 inclusive, etc. Note that $bin_0$ (values between 0 and 3) is not used in this formula. As a consequence, the value of sigma may be small if the absolute differences between pixel pairs generally fall into $bin_0$.

Figure 4:
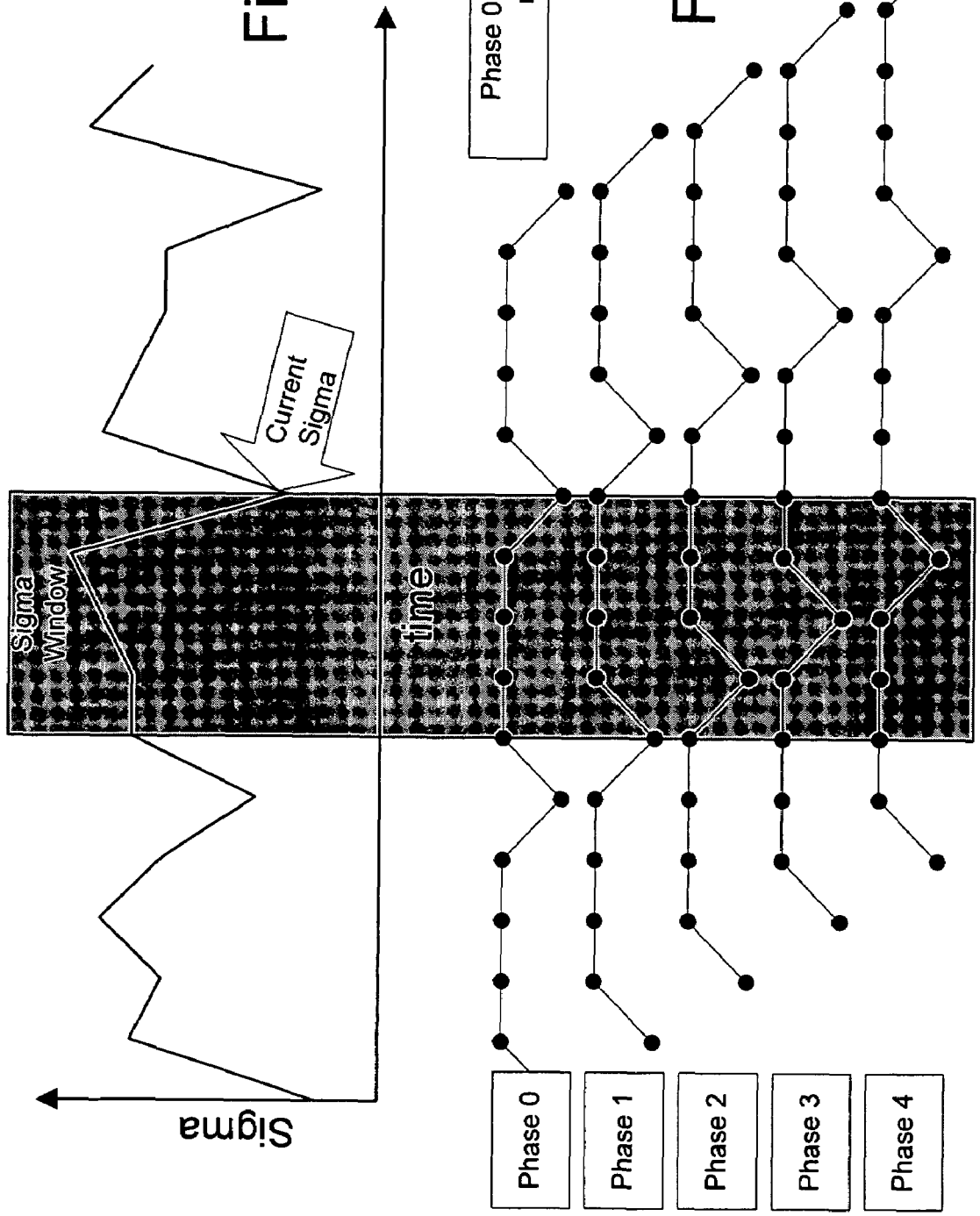
FIG. 4A illustrates an exemplary variation of sigma over time as may be calculated by the 3:2 PLD, in accordance with various aspects of the invention.
FIG. 4B illustrates the five possible field phase patterns that may be used for correlating with the graph of sigma shown in FIG. 4A, in accordance with various aspects of the invention.

FIG. 4A illustrates an exemplary variation of sigma over time as may be calculated by the 3:2 PLD, in accordance with various aspects of the invention. As illustrated, a pull-down field or repeat field may be associated with dips or low points of the graph of sigma. In this graphical embodiment, the dips occur periodically.

FIG. 4B illustrates the five possible field phase patterns that may be used for correlating with the graph of sigma shown in FIG. 4A, in accordance with various aspects of the invention. The five different patterns represent a base field phase pattern that is sequentially time shifted to form the other four field phase patterns. The base field phase pattern may represent a graph or pattern comprising five points, of which one point has a first value and the other four points have a second value. In the example shown, the pattern repeats itself with a periodicity of five. In the embodiment illustrated, the field phase pattern labeled "phase 0" is used to identify and phase lock (or synchronize) to the 3:2 pull-down video. In various aspects of the invention, a comparison or correlation of the one or more sigma values generated by the 3:2 PLD with the five different time-shifted field phase patterns may provide an indication to phase lock or synchronize to the 3:2 pull-down video. In a representative embodiment, the shape of the characteristic dip in sigma (indicative of 3:2 pull-down field) may be used to synchronize the 3:2 PLD using one of the possible five field phase patterns. In a representative embodiment, the one of the possible five field phase patterns used to synchronize the PLD comprises the "phase 0" field phase pattern. By correlating the shape of sigma over time against the five possible field phase patterns, the existence of 3:2 pull-down video may be determined. As a way of storing the shape of sigma over five field phase periods, the last five sigma values are stored in a buffer (termed a sigma table). Initially all the sigma values are reset to zero. Once the first sigma value is calculated, it overwrites the value currently in the 0th position of the sigma table. The next value of sigma is calculated and stored in the 1st position, the $2^{nd}$ position, etc., through the $4^{th}$ position. The process then wraps around to the 0th position, which is overwritten again. This means that a new sigma value is written into the sigma table after every field is processed by the 3:2 PLD. After every fifth field, all sigma table locations will have been replaced with new values. The repeat field of the 3:2 pull-down video may be identified after correlation is performed using the five field phase patterns, for example. As a consequence, the proper weave operation required for generating de-interlaced progressive video may be performed thereafter.

Figure 5:
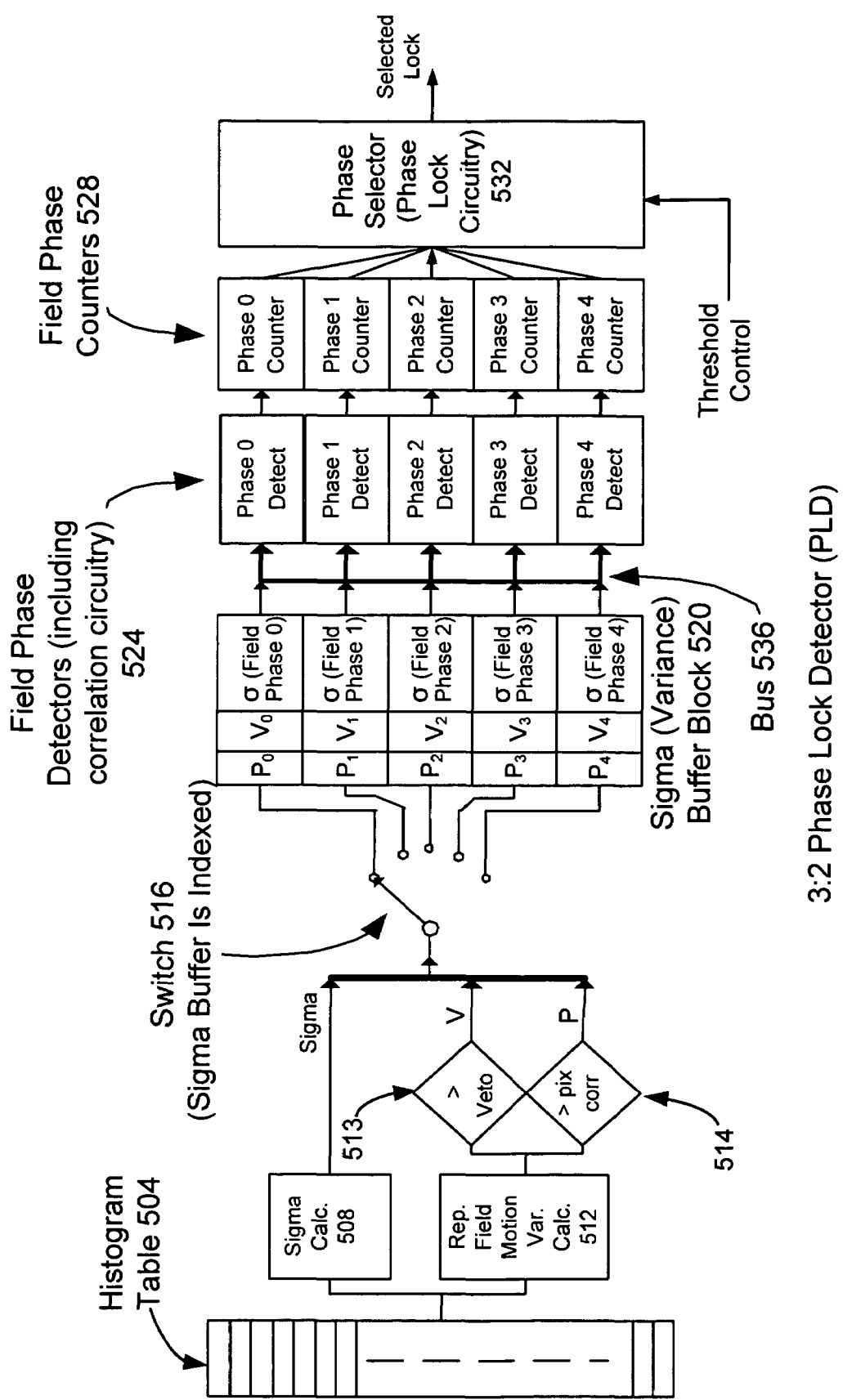
FIG. 5 is a block diagram of a system used to implement a 3:2 phase lock detector (PLD), in accordance with an embodiment of the invention.

FIG. 5 is a block diagram of a system used to implement a 3:2 phase lock detector (PLD), in accordance with an embodiment of the invention. The PLD comprises a histogram table 504, a sigma (or variance) calculator 508, a repeat field motion variance calculator 512, a veto circuitry 513, a pixel correction circuitry 514, a switch 516, a sigma (variance) buffer block 520, a set of five field phase detectors (field phase detector circuitry) 524, a set of five field phase counters 528, a phase selector 532, and a bus 536. Details of the operation and function of the 3:2 PLD may be found in U.S. patent application Ser. No. 10/871,758, filed Jun. 17, 2004. Accordingly, U.S. patent application Ser. No. 10/871,758, filed Jun. 17, 2004 is hereby incorporated herein by reference in its entirety.

Figure 6:
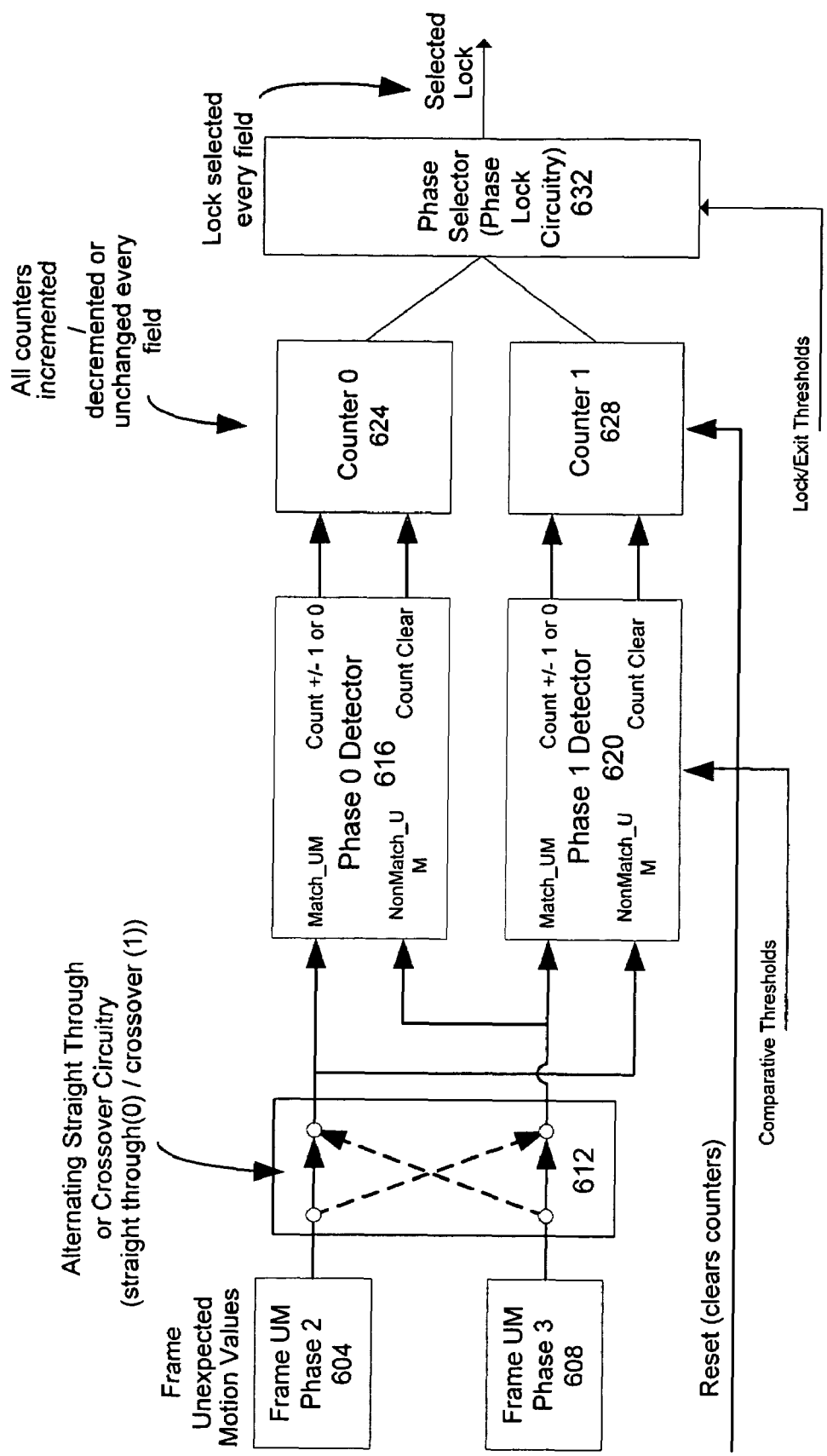
FIG. 6 is a block diagram of a system used to implement a 2:2 phase lock detector (2:2 PLD), in accordance with an embodiment of the invention.

FIG. 6 is a block diagram of a system used to implement a 2:2 phase lock detector (2:2 PLD), in accordance with an embodiment of the invention. As shown in FIG. 6, the 2:2

PLD comprises two frame unexpected motion subsystems, Frame UM 2 604 and Frame UM 3 608, that are used to generate the frame unexpected motion values. In a representative embodiment, the frame unexpected motion values may be computed using Equation 1. For the 2:2 PLD, the High-Low patterns used by the 2:2 PLD in its phase detection process correspond to field phases (at the detector stage) 2 and 3 as implemented by the 3:2 PLD, as was previously discussed in Table 1. In this representative embodiment, the Frame UM 2 is appropriately labeled to correspond with field phase at detector 2 while Frame UM 3 corresponds with field phase at detector 3 (of the 3:2 pull-down video signal). The frame unexpected motion values are input into a crossover circuitry 612. The crossover circuitry 612 provides outputs to a Phase 0 Detector 616 and a Phase 1 Detector 620, respectively labeled, in this representative embodiment, to identify the two phases of a 2:2 pull-down video signal. The Phase 0 Detector outputs control signals to a Counter #0 (or a phase 0 counter) 624 while the Phase 1 Detector outputs control signals to a Counter #1 (or a phase 1 counter) 628. The Phase 0 Detector and Phase 1 Detector may output one or more control signals that increment, decrement, or clear the two counters 624, 628. The Counters 624, 628 provide counts to a Phase Selector (or Phase Lock Circuitry) 632. The frame unexpected motion subsystems 604, 608, crossover circuitry 612, detectors 616, 620, counters 624, 628, and Phase Selector 632 may comprise one or more circuitries capable of implementing and generating the one or more outputs described herein. Further, one or more sets of software instructions resident in one or more memories of the one or more circuitries may be used to compute and generate the various outputs illustrated in FIG. 6. A processor located in the one or more circuitries may be used to execute the one or more sets of software instructions.

Frame UM 2 subsystem 604 generates a low value for the frame unexpected motion if the High-Low pattern of the received 2:2 pull-down video signal corresponds to its expected High-Low pattern. When Frame UM 2 generates a low value, Frame UM 3 should generate a high value, since it corresponds to the alternate field phase of the two possible field phases (phase 0 and phase 1). Likewise, Frame UM 3 subsystem 608 generates a low value for the frame unexpected motion if the High-Low pattern of the received 2:2 pull-down video signal corresponds to its expected High-Low pattern. When Frame UM 2 receives a signal which has a low frame unexpected motion value, Frame UM 3 should receive a signal which has a high frame unexpected value, and vice-versa, if the received signal comprises 2:2 pull-down video. The 2:2 PLD further comprises crossover circuitry 612 that receives the frame unexpected motion values provided by Frame UM 2 604 and Frame UM 3 608. The Phase 0 Detector 616 utilizes the inputs presented to its Match_UM and NonMatch_UM inputs by way of a detection processing circuitry and/or execution of a software program. Similarly, the Phase 1 Detector 620 utilizes the inputs presented to its Match_UM and NonMatch_UM inputs by way of a detection processing circuitry and/or execution of a software program. The Phase Selector (or Phase Lock Circuitry) 632 determines what phase is currently selected as the locked phase, based on the counts provided by Counter #0 624 and Counter #1 628. The Phase Selector (or Phase Lock Circuitry) 632 may compare the counts of Counter #0 624 and Counter #1 628 to one or more threshold values. The one or more threshold values may be stored or programmed into one or more memory registers. The one or more threshold values may comprise a first threshold value that facilitates a lock onto its corresponding phase when the first threshold value is attained, a second threshold value that facilitates exiting a lock to its corresponding phase when the second threshold value is attained. The counters 624, 628 may use respective saturation values, or minimum values that limit the respective counts of each of the two counters 624, 628.

When its crossover function is enabled, the crossover circuitry 612 performs an internal switching of its received inputs such that the output provided by Frame UM 2 is transmitted to the input of the Phase 1 Detector while the output provided by Frame UM 3 is transmitted to the input of the Phase 2 Detector. The switching performed is a function of the field count (e.g., field_count), and is performed at either every even (or odd) value of the field count (which counts using modulo 2 in this representative embodiment). For example, when field_count=1 (an odd valued field count), the signal received at Frame UM 2 may correspond to the sequence Low-High-Low-High. If the frame unexpected motion value generated by Frame UM 2, as computed using Equation 1, comprises a small value, the frame unexpected motion value generated by Frame UM 3, as computed using Equation 1, should comprise a large value. On the other hand if the frame unexpected motion value generated by Frame UM 2, as computed using Equation 1, comprises a large value, the frame unexpected motion value generated by Frame UM 3, as computed using Equation 1, should comprise a small value. Note that the expected High-Low patterns for field phase at detector 2 is the opposite of that for field phase at detector 3, as described in reference to Table 1. In the next field count, field_count=2, the signal received at Frame UM 2 should correspond to the sequence High-Low-High-Low. As a result, the frame unexpected motion value generated by Frame UM 2, as computed using Equation 1, should be a high value. However, at even field counts, the crossover circuitry 612 is enabled, causing the high value generated by Frame UM 2 to be transmitted to Phase 1 Detector 620. Likewise, during field_count=2, a low value generated by Frame UM 3 is transmitted by way of the crossover circuitry 612 to Phase 0 Detector 616. Overall, the use of the crossover circuitry 612 ensures that Match_UM of the Phase 0 Detector 616 continues to receive a low value for Match_UM as the field count alternates from odd to even values, when the expected High-Low patterns coincide with what is expected at the Frame UM 2 and Frame UM 3 subsystems. This also ensures that Match_UM of the Phase 1 Detector 620 continues to receive a high value for its Match_UM when the Match_UM of Phase 0 Detector 616 receives the low value. The NonMatch_UM inputs of the Phase 0 Detector 616 and Phase 1 Detector 620 should receive values opposite to that of their Match_UM values.

In a representative embodiment, the following pseudo-code summarizes the processing performed when a software program is executed that implements one or more operations/functions provided by the Phase 0 Detector 616 or Phase 1 Detector 620 of the 2:2 PLD. The software program may reside within the Phase 0 Detector or Phase 1 Detector, for example. The pseudo-code references one or more exemplary parameters—REV22_UPPER_MATCH_THRESH, REV22_LOWER_NONMATCH_THRESH, and REV22_NONMATCH_MATCH_RATIO.

```
if(Match_UM >= REV22_UPPER_MATCH_THRESH ||
Match_UM > NonMatch_UM) then
    //Equivalent of bad-edit and veto situations.
    Instruct this phase's counter to be cleared to zero.
else if (Match_UM < REV22 UPPER_MATCH_THRESH &&
```

-continued

```
    NonMatch_UM > REV22_LOWER_NONMATCH_THRESH)
    then
//Ratio below effectively divided by two from integer in
register.
    if ((NonMatch_UM << 1) >
    REV22_NONMATCH_MATCH_RATIO *
    Match_UM) then
        //Only increment counter if sufficient ratio
        is measured.
        Instruct increment of this phase's counter.
    else if (NOT this phase currently rev2:2 locked) then
        //Only decrement if this phase is not already
        locked.
        Instruct decrement of this phase's counter.
    else
        Instruct leaving this phase's counter unchanged.
else
    Instruct decrement of this phase's counter.
```

With respect to the above referenced pseudo-code, the value of Match_UM is expected to be a low value for a particular 2:2 field phase (0 or 1) if it has been computed from the Frame UM subsystem (either 2 or 3) that corresponds or matches with its expected High-Low pattern. Its Non-Match_UM is expected to be a high value since its corresponding High-Low pattern is opposite to the High-Low pattern that its counterpart Frame UM subsystem uses. As indicated by the first three lines of the above referenced pseudo-code, the corresponding phase counter (either Counter 0 or Counter 1) is reset to zero, if Match_UM is greater than or equal to a threshold given by REV22_UPPER_MATCH_THRESH or if Match_UM is greater than NonMatch_UM. Otherwise, if Match_UM is less than REV22_UPPER_MATCH_THRESH and Non-Match_UM is greater than REV22_LOWER_NONMATCH_THRESH, and the ratio of NonMatch_UM to Match_UM is greater than REV22_NONMATCH_MATCH_RATIO/2, then the corresponding counter is incremented by one. If the ratio of Non-Match_UM and Match_UM is not greater than REV22_NONMATCH-MATCH-RATIO/2, and the corresponding counter is not phase locked, then the corresponding counter is decremented by one. However, if the corresponding counter is phase locked, then the corresponding phase counter is left unchanged. As a consequence, the corresponding phase detector may output a zero value to its corresponding counter. Thereafter, if as previously mentioned, Match_UM is less than REV22_UPPER_MATCH_THRESH and NonMatch_UM is greater than REV22_LOWER_NONMATCH_THRESH does not hold true, then the corresponding phase counter is decremented by one. The phase detector algorithm referenced by the pseudo-code only increments the corresponding counter when not only are the measured unexpected motion values, Match_UM and NonMatch_UM, bounded by the two programmable thresholds, but also that the ratio of Non-Match_UM to Match_UM is sufficiently large. Since high vertical detail within the pull-down video may affect both values, insisting on a sufficient ratio before incrementing the counter ensures that larger Match_UM values are tolerated as long as the NonMatch_UM is sufficiently large.

The counters 624, 628 behave in a similar manner to those used for 3:2 pull-down. When instructed to increase, they increase up to a programmable maximum threshold (REV22_LOCK_SAT_LEVEL). If the 2:2 PLD is currently not locked, as a counter crosses a programmable threshold referred to as REV22_ENTER_LOCK_LEVEL, the corresponding phase becomes locked. Should it decrease below a programmable threshold referred to as REV22_EXIT_LOCK_LEVEL, the corresponding phase becomes unlocked. In this representative embodiment, the count is lower bounded by the value zero.

Recall that the field count (alternating between even and odd values) may be used to control the straight through/crossover functionality of the Frame UM values using the crossover circuitry 612. The following equation defines the 2:2 pull-down field phase:

$$\text{field\_phase\_rev22} = ((\text{field\_count} \bmod 2) + \text{lock\_phase}) \bmod 2$$

The field phase (given by field_phase_rev22) may be expressed using the modulo 2 field count (given by field_count) in conjunction with the locked field phase (given by lock_phase). The field_phase_rev22 alternates between 0 and 1 as required.

One or more thresholds and/or parameters may be stored as values in one or more registers shown in Table 2. For example, REV22_UPPER_MATCH_THRESH may comprise the value 625 while REV22_LOWER_NONMATCH_THRESH may comprise the value 468, as shown.

TABLE 2

Reverse 2:2 Registers

| Register Name | Register Format | Reset Value |
| --- | --- | --- |
| REV22_UPPER_MATCH_THRESH | U10.0 | 625 |
| REV22_LOWER_NONMATCH_THRESH | U10.0 | 468 |
| REV22_NONMATCH_MATCH_RATIO | U4.0 | 8 |
| REV22_LOCK_SAT_LEVEL | U11.0 | 32 |
| REV22_ENTER_LOCK_LEVEL | U11.0 | 25 |
| REV22_EXIT_LOCK_LEVEL | U11.0 | 20 |
| AUTOREV22_ENABLE | U1.0 | 1 |
| FIELD_PHASE_22 | U1.0 | 0 |
| LOCKED_22 | U1.0 | 0 |
| SELECTED_LOCK | U2.0 | 0 |

Figure 7A:
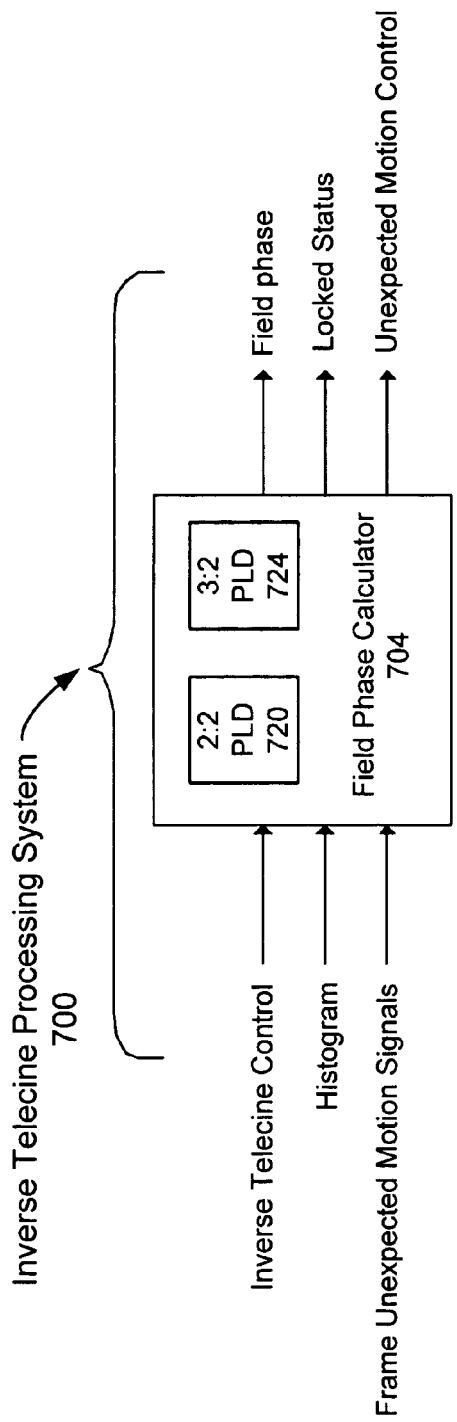
FIG. 7A is a block diagram that comprises an inverse telecine system, in accordance with an embodiment of the invention.

FIG. 7A is a block diagram that comprises an inverse telecine processing system 700 in accordance with an embodiment of the invention. In a representative embodiment, the inverse telecine processing system 700 implements inverse telecine operations and functions. The inverse telecine operations may comprise detection and phase lock of either a 3:2 or 2:2 pull-down video signal. In a representative embodiment, the inverse telecine processing system 700 comprises a field phase calculator subsystem 704. The field phase calculator subsystem 704 comprises the 3:2 phase lock detector (PLD) 720 and 2:2 phase lock detector (PLD) 724 as previously described in relation to FIGS. 5 and 6. In a representative embodiment, the inverse telecine processing system 700 facilitates detection of either a 3:2 or 2:2 pull-down and may provide one or more control signals to facilitate either reverse 3:2 or reverse 2:2 pull-down video processing. The 2:2 or 3:2 PLD 720, 724 may comprise one or more circuitries capable of implementing its functions as was discussed in relation to FIGS. 5 and 6. As illustrated, exemplary inputs to the field phase calculator 704 include an inverse telecine control signal, a histogram data signal, and signal(s) that provide a measure of frame unexpected motion. The frame unexpected motion signals may comprise Frame UM 2 or Frame UM 3, for example. Exemplary outputs from the field phase calculator 704 may comprise a field phase signal, a locked status signal (indicating the locked field phase), and unexpected motion control signal(s), for example.

Figure 7B:
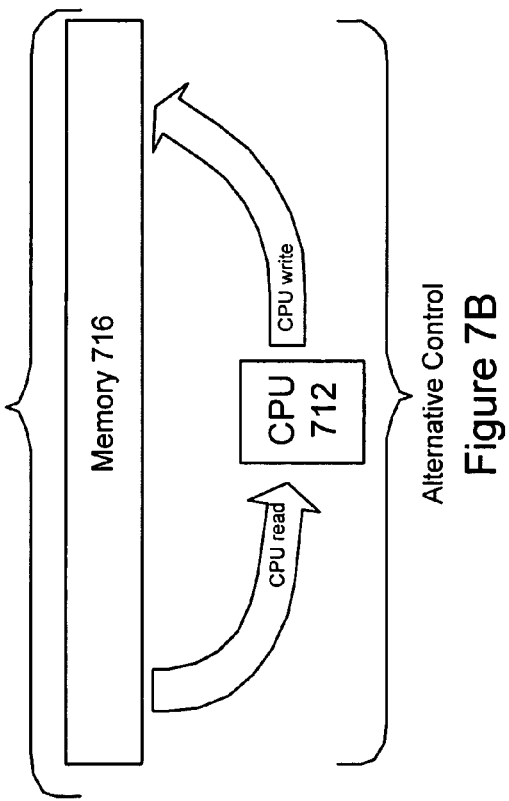
FIG. 7B is a block diagram that comprises an alternate inverse telecine system, in accordance with an embodiment of the invention.

FIG. 7B is a block diagram that comprises an alternate inverse telecine system 708 in accordance with an embodiment of the invention. The alternate inverse telecine system 708 comprises a CPU 712 and a memory 716. The alternate inverse telecine system 708 may be implemented to replace one or more circuitries used in the embodiment illustrated in FIG. 7A by using the central processing unit (CPU) 712 and the memory 716. In this representative embodiment, the central processing unit (CPU) 712 and the memory 716 may be used to implement the 3:2 and 2:2 phase lock detectors (PLDs) 720, 724, described previously in reference to FIGS. 5 and 6. As performed by the inverse telecine processing system 700 illustrated in FIG. 7A, the embodiment of FIG. 7B is used to implement inverse telecine operations and functions, such as detecting and locking onto a 3:2 or a 2:2 pull-down video signal. The CPU 712 may execute a set of software instructions resident in the memory 716 for facilitating the inverse telecine operations and functions. As shown, the CPU 712 may interact with the memory 716 by reading from and writing into the memory 716.

In a representative embodiment, an output control circuitry may provide control signals such as AUTOREV22_ENABLE and AUTOREV32_ENABLE for enabling or disabling phase locking functionality of the phase lock circuitries described in FIGS. 5 and 6. In a representative embodiment, both the 3:2 and 2:2 PLDs are operated in parallel. For example, AUTOREV22_ENABLE and AUTOREV32_ENABLE may comprise control signals which enable/disable either of the two phase selectors 532, 632. In a representative embodiment, if both AUTOREV22_ENABLE and AUTOREV32_ENABLE are set high, and both PLDs indicate a lock, then whichever PLD (i.e., 2:2 PLD or 3:2 PLD) established its phase lock first will retain its lock. In the highly unlikely event that both phase selectors 532, 632 lock at exactly the same field time, either lock may be chosen.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of detecting and locking onto a field phase of a 2:2 pull-down video signal comprising:
   computing an approximation of the luminance for each absent pixel of an output video frame, said computing using one or more present pixels, said one or more present pixels originating from a field of a source film frame;
   computing one or more first differences using said approximation of the luminance for each absent pixel in said output video frame and corresponding present pixels in one or more adjacent fields of said output video frame;
   categorizing said one or more first differences into expected low values or expected high values based on each of two field phases;
   computing one or more first second differences over said each absent pixel of said output video frame, said one or more first second differences based on a first of said two field phases; and
   computing one or more second second differences over said each absent pixel of said output video frame, said one or more second second differences based on a second of said two field phases, each second difference of said one or more first second differences and said one or more second second differences used to measure a detector pixel unexpected motion of said each absent pixel of said output video frame, said one or more first second differences and said one or more second second differences computed by subtracting the maximum of said expected low values by an average of said expected high values.

2. The method of claim 1 wherein said approximation is computed using adjacent vertically spatial pixels from said field of said source film frame.

3. The method of claim 1 further comprising summing one or more first values, said one or more first values corresponding to one or more second values, each of said one or more second values generated by computing said second difference over said each absent pixel of said output video frame for each of said two field phases, said summing providing a first frame unexpected motion value for said first of said two field phases, said summing providing a second frame unexpected motion value for said second of said two field phases.

4. The method of claim 3 wherein said one or more first values increases as said one or more second values increases.

5. The method of claim 4 wherein said measure of frame unexpected motion is given by the following equation:

$$\text{Frame\_unexpected\_motion} += \begin{cases} 0 & \text{when } -255 \le m < 4 \\ 1 & \text{when } 4 \le m < 8 \\ 2 & \text{when } 8 \le m < 16 \\ 4 & \text{when } 16 \le m < 32 \\ 8 & \text{when } 32 \le m < 255 \end{cases}.$$

6. The method of claim 3 further comprising resetting a first counter of two counters, said first counter associated with said first of said two field phases, said resetting performed if a first condition is true, said first condition comprising said first frame unexpected motion value associated with said first of said two field phases is greater than or equal to a first threshold or said frame unexpected value associated with said first of said two field phases is greater than said second frame unexpected value associated with said second of said two field phases.

7. The method of claim 6 further comprising incrementing said first counter of said two counters if each of a second condition, a third condition, and a fourth condition are true, said second condition comprising the inverse of said first condition, said third condition comprising said first frame unexpected motion value associated with said first of said two field phases is less than said first threshold and said second frame unexpected value associated with said second of said two field phases is greater than a second threshold, said fourth condition comprising a ratio is greater than one half of a third threshold, said ratio comprising said second frame unexpected value associated with said second of said two field phases divided by said first frame unexpected motion value associated with said first of said two field phases.

8. The method of claim 7 further comprising decrementing said first counter of said two counters if each of said second condition, said third condition, inverse of said fourth condition, and a fifth condition are true, said fifth condition comprising that said one of said two field phases is not locked.

9. The method of claim 7 further comprising leaving said first counter of said two counters unchanged if each of said second condition, said third condition, inverse of said fourth condition, and a fifth condition are true, said fifth condition comprising that said one of said two field phases is locked.

10. The method of claim 7 further comprising decrementing said first counter of said two counters if the inverse of said third condition is true.

11. A system for detecting and locking onto a field phase for a 2:2 pull-down video comprising:
   a first circuitry that computes frame unexpected motion values;
   a second circuitry that receives said frame unexpected motion values from said first circuitry as its inputs, said inputs processed using an alternating straight through or crossover function to generate corresponding outputs;
   a third circuitry that processes said outputs generated by said second circuitry to generate one or more control signals;
   a pair of counters that receives said one or more control signals and generates a pair of outputs; and
   a phase selection circuitry that locks onto one of two field phases based on said pair of outputs generated by said pair of counters.

12. A method of detecting and locking onto a field phase in 3:2 or 2:2 pull-down video comprising:
   computing an approximation of the luminance for each absent pixel, said each absent pixel associated with an output video frame, said computing using one or more present pixels;
   computing one or more first differences using said approximation of the luminance for each absent pixel in said output video frame and corresponding present pixels in one or more adjacent fields of said output video frame;
   categorizing said one or more first differences into expected low values or expected high values; and
   computing a second difference for said each absent pixel of said output video frame, said second difference computed based on one of five field phases, said second difference computed by subtracting the maximum of said expected low values by an average of said expected high values.

13. The method of claim 12 wherein said each absent pixel of said output video frame is accumulated over the entire said output video frame to generate corresponding sums for each of said one of five field phases.

14. The method of claim 13 wherein said sums are used to determine said field phase in said pull-down video.

15. The method of claim 14 wherein said field phase is determined by selecting a sum of said sums which has lowest value.

16. A system for detecting and locking onto a field phase in pull-down video comprising:
   at least one circuitry for:
   computing an approximation of the luminance for each absent pixel, said each absent pixel associated with an output video frame, said computing using one or more present pixels;
   computing one or more first differences using said approximation of the luminance for each absent pixel in said output video frame and corresponding present pixels in one or more adjacent fields of said output video frame; and
   categorizing said one or more first differences into expected low values or expected high values.

17. The system of claim 16 comprising:
   said at least one circuitry for:
   computing a second difference for said each absent pixel of said output video frame, said second difference computed based on one of five field phases, said second difference computed by subtracting the maximum of said expected low values by an average of said expected high values.

18. The system of claim 17 wherein said each absent pixel of said output video frame is accumulated over the entire said output video frame to generate corresponding sums for each of said one of five field phases.

19. The system of claim 18 wherein said sums are used to determine said field phase in said pull-down video.

20. The system of claim 19 wherein said field phase is determined by selecting a sum of said sums which has lowest value.

21. A method of detecting and locking onto a field phase in 3:2 and/or 2:2 pull-down video comprising:
   computing an approximation of the luminance for each absent pixel, said each absent pixel associated with an output video frame, said computing using one or more present pixels, said one or more present pixels originating from a source film frame;
   computing one or more first differences using said approximation of the luminance for each absent pixel in said output video frame and corresponding present pixels in one or more adjacent fields of said output video frame;
   categorizing said one or more first differences into expected low values or expected high values; and
   computing a second difference for said each absent pixel of said output video frame, said second difference computed based on one of five field phases, said second difference computed by subtracting the maximum of said expected low values by an average of said expected high values.

22. A method of detecting and locking onto a field phase in 3:2 and/or 2:2 pull-down video comprising:
   computing an approximation of the luminance for each absent pixel, said each absent pixel associated with an output video frame, said computing using one or more present pixels, said one or more present pixels originating from a source film frame;
   computing one or more first differences using said approximation of the luminance for each absent pixel in said output video frame and corresponding present pixels in one or more adjacent fields of said output video frame;
   categorizing said one or more first differences into expected low values or expected high values; and
   computing a second difference for said each absent pixel of said output video frame, said second difference computed based on one of five field phases, said second difference computed by subtracting the maximum of said expected low values by an average of said expected high values.

23. A system for detecting and locking onto a field phase of a pull-down video comprising:
   a memory;
   a processor; and
   a set of software instructions resident in said memory, said processor executing said set of software instructions to compute luma differences between absent pixels of a progressive video output frame and corresponding present pixels of an adjacent field corresponding to the same source film frame in said pull-down video, wherein expected values of said luma differences are used to determine said field phase.

* * * * *